United States Patent
Ramsden

(10) Patent No.: US 6,958,625 B1
(45) Date of Patent: Oct. 25, 2005

(54) PROGRAMMABLE LOGIC DEVICE WITH HARDWIRED MICROSEQUENCER

(75) Inventor: Edward A. Ramsden, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 80 days.

(21) Appl. No.: 10/617,980

(22) Filed: Jul. 10, 2003

(51) Int. Cl.[7] .......................... H03K 19/173; G06F 7/38
(52) U.S. Cl. .......................................... 326/46; 326/40
(58) Field of Search .............................. 326/46, 40, 38, 326/39, 41, 47

(56) References Cited

U.S. PATENT DOCUMENTS

| | | |
|---|---|---|
| 4,831,573 A | 5/1989 | Norman |
| 5,042,004 A * | 8/1991 | Agrawal et al. ............ 712/243 |
| 5,349,670 A | 9/1994 | Agrawal et al. |
| 5,583,450 A | 12/1996 | Trimberger et al. |
| 5,650,734 A | 7/1997 | Chu et al. |
| 5,869,980 A | 2/1999 | Chu et al. |
| 6,438,738 B1 | 8/2002 | Elayda |

OTHER PUBLICATIONS

Excerpted text from webpage at http://www.pldworld.com/html/technote/Tour_of_PLDs.htm, Chang-woo Yang, "Programmable Sequencers", last modified Jul. 22, 2001.

* cited by examiner

*Primary Examiner*—Daniel D. Chang
(74) *Attorney, Agent, or Firm*—Jonathan Hallman; MacPherson Kwok Chen & Heid

(57) ABSTRACT

A programmable logic device configurable to implement a finite state machine includes a hardwired microsequencer for executing microinstructions to sequence the finite state machine. The hardwired microsequencer includes a sequence memory for storing the microinstructions and a program counter.

20 Claims, 3 Drawing Sheets

PROGRAMMABLE LOGIC DEVICE WITH HARDWIRED MICROSEQUENCER

TECHNICAL FIELD

The present invention relates generally to programmable logic devices, and more particularly to a programmable logic device that facilitates the implementation of state machines.

BACKGROUND

Many functions desired by a user of a programmable logic device may be implemented by configuring the device to form a finite state machine. A finite state machine may be implemented in a programmable logic device in a number of ways. For example, each state may be assigned to a flip-flop within the programmable logic device in a technique known as "one-hot" encoding. In such a method, the number of states equals the required number of flip-flops. Thus, as the complexity of the state machine increases, the required number of flip-flops may become excessive. To reduce the required number of flip-flops for a complex design, the states may be binary encoded such that the required number of flip-flops equals $\log_2$(number of states).

Even with the use of binary encoding, the logic required to perform the state transition burdens the resources of a programmable logic device. In particular, many useful state machines have a "program-like" behavior in which successive states are either predetermined (linear sequence) or selected from a choice of two or more possibilities (branching). Implementing such a state machine can require a significant amount of logic resources. For example, in a complex programmable logic device (CPLD), each logic block provides a limited number of product terms and a limited number of flip-flops. A particular state machine implementation may require multiple logic blocks because it has more product terms than are available from a single logic block. Moreover, the limited number of flip-flops in a single logic block may be too small to enable one-hot encoding of such a state machine.

Accordingly, there is a need in the art for an improved programmable logic devices that facilitates the implementation of state machines.

SUMMARY

One aspect of the invention relates to a programmable logic device including a programmable logic block operable to provide logical outputs at its output terminals from logical inputs received at its input terminals. The programmable logic device further includes a hardwired microsequencer coupled to the input and output terminals of the programmable logic block, the microsequencer operable to provide a sequence of logical inputs to the programmable logic block, at least part of the sequence determined by logical outputs received from the programmable logic block.

Another aspect of the invention relates to a method of sequencing a finite state machine in a programmable logic device including the act of generating input conditions for a finite state machine in a programmable logic block based upon a set of inputs; selecting an input condition from the generated input conditions based upon a previously-executed microinstruction selected from a hardwired read-only memory; selecting a microinstruction from a set of stored microinstructions in the read-only memory based upon the selected input condition and the previously-executed microinstruction; and executing the selected microinstruction to provide inputs for the set of inputs.

BRIEF DESCRIPTION OF THE DRAWINGS

Use of the same reference symbols in different figures indicates similar or identical items.

DETAILED DESCRIPTION

Figure 1:
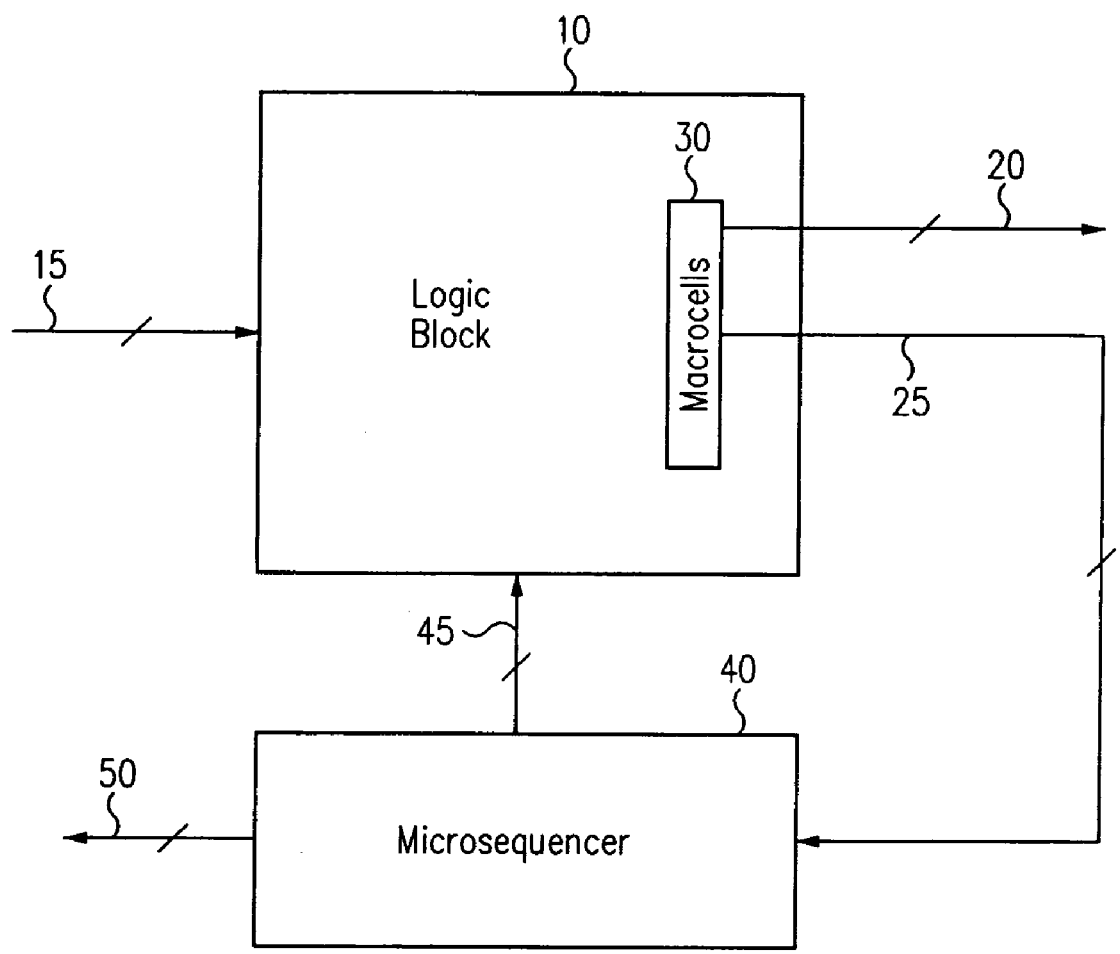
FIG. 1 is a block diagram of a programmable logic device with an embedded microsequencer according to one embodiment of the invention.

Turning now to FIG. 1, a programmable logic device (PLD) 10 may receive inputs 15 and provide logical outputs 20 such as product terms or sum of product terms based upon a desired logical function that a user wishes to implement. As is known in the art, a logic block 12 within PLD 10 includes macrocells 30 which may be configured as to provide either a combinatorial or a registered output.

Should a user desire to implement a state machine using programmable logic device 10, a hardwired microsequencer 40 performs the required state sequencing. As used herein, "hardwired" shall denote circuitry that is dedicated to perform a function such as microsequencing and cannot be configured, programmed, or otherwise changed to perform another function. Such an approach stands in contrast to the configuration of programmable logic blocks to perform such a function as discussed previously. Thus, the logical resources of programmable logic device 10 no longer need to be burdened with performing the required state sequencing. Instead, these logical resources are available for logic function evaluation and non-sequential storage functions. In addition, by providing programmable logic device 10 with embedded microsequencer 40, a simple mapping between statements in a programming language and hardware is enabled as will be described further herein.

Microsequencer 40 determines the next state for the state machine by executing a microinstruction based on input conditions 25 and a previously-executed microinstruction. Input conditions 25 represent a subset (or all) of logical outputs 20 from macrocells 30, and the previously-executed microinstruction represents the current state of the state machine. In addition, the next state determined by microsequencer 40 could also depend on input conditions other than those provided by macrocells 30, e.g., some or all of logical inputs 15 or inputs from an external device. Based upon the executed microinstruction, microsequencer 40 provides one or more auxiliary logical inputs 45 that may affect the logical outputs 20 from PLD 10. In addition, microsequencer 40 may provide one or more command outputs 50 to external devices such as timers, counters, or arithmetic logic units (ALUs).

Figure 2:
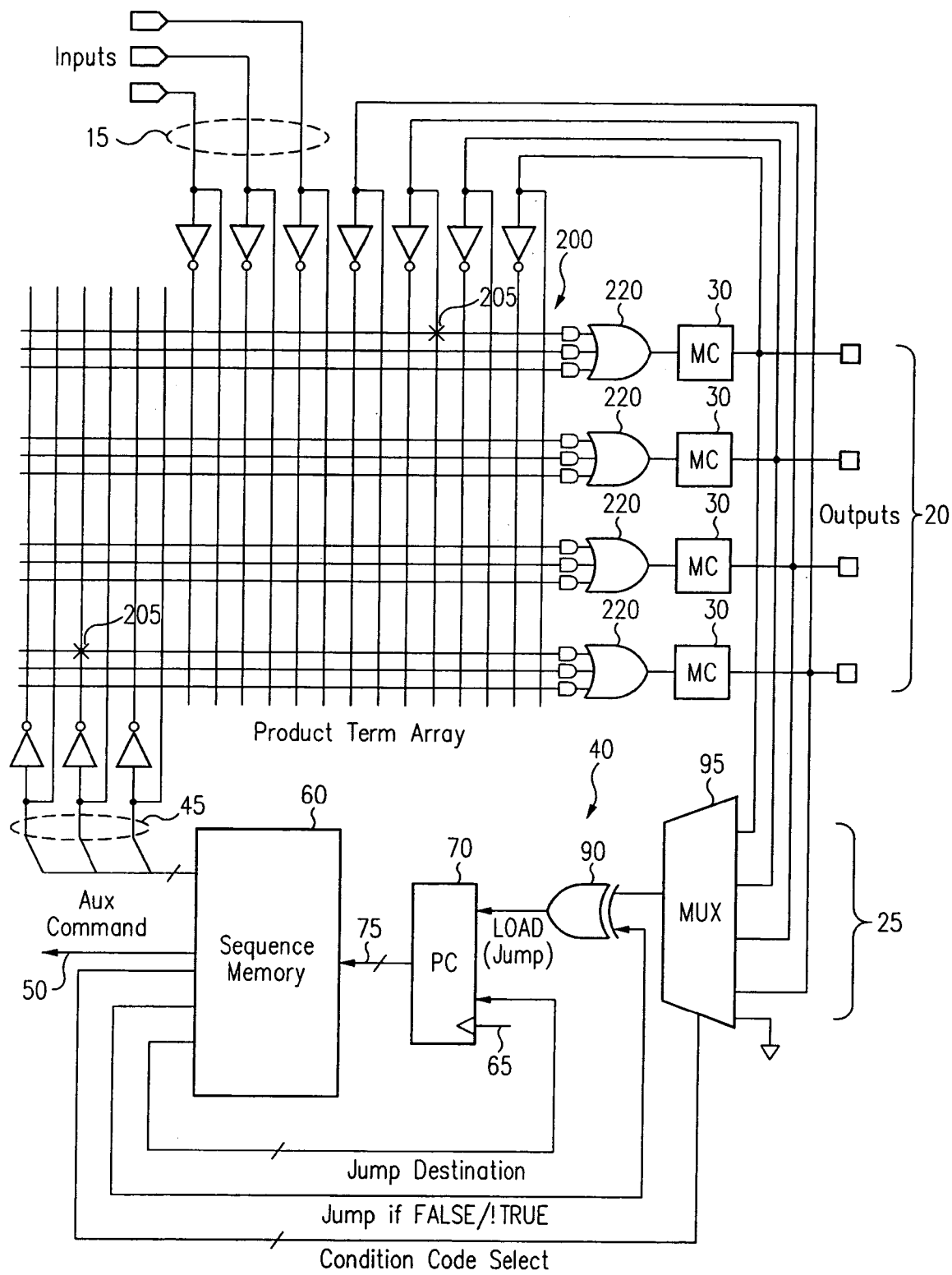
FIG. 2 is a schematic illustration of a programmable logic block configured to implement a finite state machine with an embedded microsequencer according to one embodiment of the invention.
Figure 4:
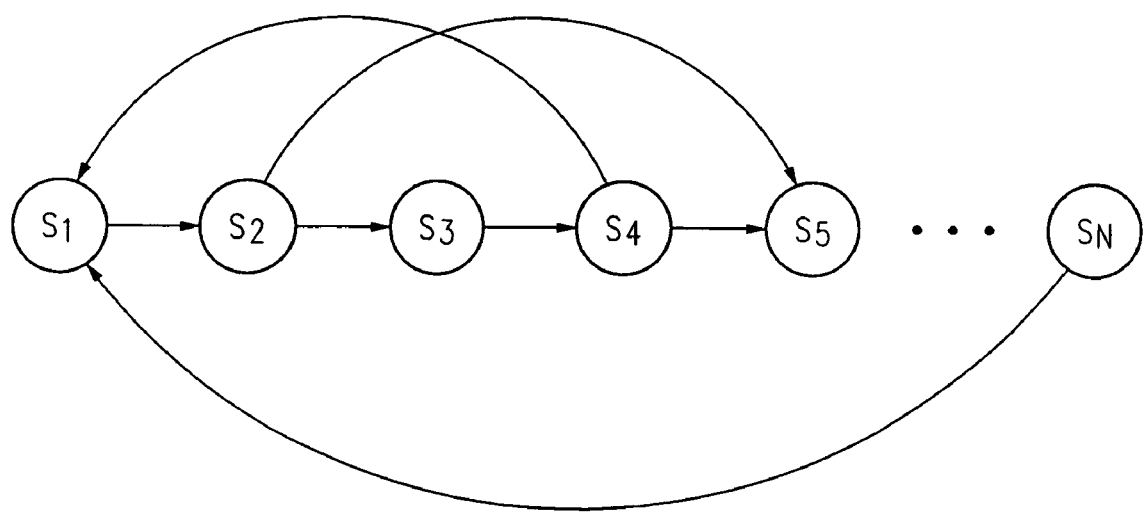
FIG. 4 is a state diagram for a finite state machine.

An exemplary architecture for microsequencer 40 is shown in FIG. 2. A microcode memory such as a read-only memory (ROM) 60 stores microinstructions for sequencing the desired state machine. A program counter 70 cyclically provides an address 75 to microcode ROM 60 responsive to a system clock 65. The retrieved microinstruction at address 75 determines how the state machine will sequence to the next state. The depth of the microcode ROM determines the width of the address 75. For example, if microcode ROM stores thirty-two microinstructions, an address of 5 bits in width is sufficient to identify any given microinstruction. To minimize glitches, the addresses may be gray-coded with respect to the state machine sequence. For example, FIG. 4 shows a state diagram for a state machine having a predetermined succession of states. Should program counter's current count correspond to the address 75 for state $S_1$, program counter 70 would increment its count to correspond to the address 75 for state $S_2$ at the next cycle of system clock 65. Similarly, responsive to successive cycles of system clock 65, program counter would increment to the addresses 75 for states $S_3$, $S_4$, $S_5$, and finally state SN before starting anew at state $S_1$. By storing the address of the executed microinstruction, program counter 70 acts to store the current state.

The pre-determined state succession controlled by program counter 70 may be interrupted by state transitions that jump with respect to this "normal" state succession. For example, depending upon input conditions, the state machine may transition from state $S_2$ to state $S_5$ or from $S_4$ to $S_1$. Depending upon the address 75 received from program counter 70, a particular microinstruction is retrieved from microcode ROM 60. Fields within the retrieved microinstruction may be used to form various commands. For example, a field within the current-retrieved microinstruction may correspond to a jump destination address. Should input conditions be appropriate at the next cycle of clock 65, program counter 70 will have address 75 correspond to the address specified by the jump destination. Note that in such a situation, program counter 70 does not increment its count in the normal sequential fashion discussed with respect to FIG. 3. A condition code select field in the retrieved microinstruction from microcode ROM 60 may be used to specify the input condition that will determine whether a jump should be made to the jump destination. A condition multiplexer 95 selects from input conditions 25 responsive to the condition code select field within the currently-retrieved microinstruction from microcode ROM 60. An XOR gate 90 receives the selected condition from condition multiplexer 95 and provides polarity control (controlling whether the selected condition should be true or false to effect a jump) responsive to a field that may be denoted as "Jump if FALSE/!TRUE" in the currently-retrieved microinstruction from microcode ROM 60. Another field in the current-retrieved microinstruction may be used to provide command outputs 50 to external devices such as timers, counters, or arithmetic logic units (ALUs). Should a desired state machine implementation require a "jump always" or "jump never" branching condition, multiplexer 95 may receive an input having a fixed logic state such as ground. If this fixed input is selected, the "jump always" or "jump never" branching condition will be selected depending upon the polarity control given to XOR gate 90. In a "jump never" branching condition, the state sequencing would solely depend upon the sequential counting performed by program counter 70. Conversely, in the "jump always" branching condition, the state sequencing would depend solely upon the jump destination provided to program counter 70.

Figure 3:
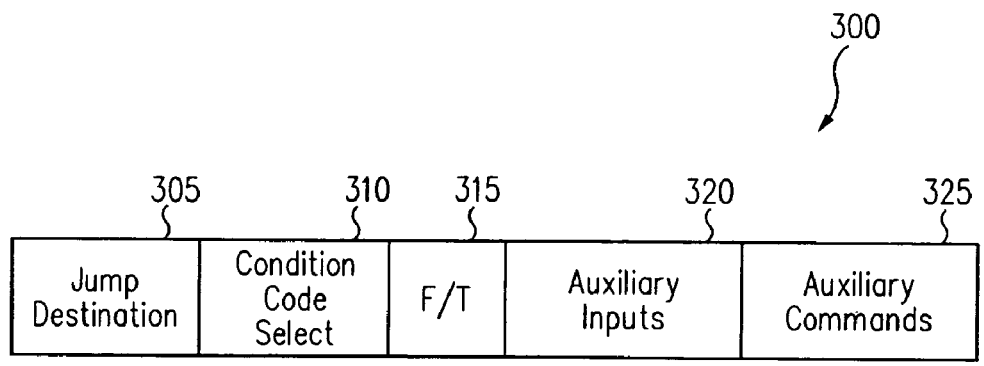
FIG. 3 illustrates the fields for an exemplary microinstruction.

A sample microinstruction format 300 for a microinstruction is shown in FIG. 3. In field 305, the jump destination would be specified. Referring back to FIG. 2, the jump destination is an address provided to program counter 70. If the output of XOR gate 90 is asserted (thereby indicating a jump should occur), sequence memory 60 will retrieve the microinstruction at the address specified by the jump destination. Accordingly, the bit size of the jump destination depends upon the depth of sequence memory 60. For example, if sequence memory 60 stores 32 microinstructions, jump destination field 305 would have to be at least 5 bits wide. The condition code select field 310 specifies the condition code select for controlling the selection by multiplexer 95 (FIG. 2). In the embodiment illustrated, multiplexer 95 is a 5:1 multiplexer such that condition code select field would have to be at least 3 bits wide. True or false field 315 specifies the Jump if FALSE/!TRUE field for controlling the polarity for which a selected condition from multiplexer 95 will determine a jump condition as discussed with respect to FIG. 2. Accordingly, true or false field 315 need be only one bit wide. Finally, fields 320 and 325 specify auxiliary inputs 45 and auxiliary commands 50, respectively. The number of such inputs and commands depends upon an individual design. The width of the fields follows accordingly.

In the exemplary architecture illustrated in FIG. 2, macrocells 30 receive sum of product term outputs from a logic block that comprises a programmable AND array 200 OR gates 220 associate with each macrocell 30 such that each OR gate 220 may provide sums of product term outputs to its respective macrocell 30. Auxiliary logic inputs 45 from field 320 in the currently-retrieved codeword from microcode ROM 60 may be provided to the AND array.

Operation of the microsequencer is best understood with an example. Should the finite state machine being implemented be used to perform the power-on sequencing of a power supply, it may be desirable to suppress any "power bad" flags during the power-up interval during which the power supply is stabilizing. After power-up is completed, however, these flags should be enabled. The use of auxiliary logical inputs 45 enables a user to thus alter the finite state machine's behavior to provide different modes of operation. In such an implementation, suppose the power bad flag corresponded to a product term output from AND array 200 (FIG. 2) such that if this product term output were true, the power bad flag is asserted. Auxiliary inputs 45 may then include a "power bad suppressor" input for affecting this product term output. Because a product term is the logical AND of all the fused-in inputs, if the power bad suppressor input is kept false, the power bad flag cannot be asserted. During power-up, microsequencer 40 may sequence through any number of states. These states may be arbitrarily denoted as states S1 through SN, where N is a positive integer greater than 1.

Referring to FIG. 2, in such a linear succession of states, the LOAD signal from XOR gate 90 will not be asserted such that program counter 70 does not respond to the jump destination. Instead program counter 70 merely sequences the address 75 provided to sequence memory 60 responsive to cycles of clock 65. The executed microinstructions for these states S1 through SN will have all the "power bad suppressor input" asserted within field 320 (FIG. 3). Similarly, these executed microinstructions have the same condition code select signal within field 310. This condition code select signal controls multiplexer 95 to select for the same logical output 20 from a particular macrocell 30. This logical output 20 will not be asserted until the power-up interval has been completed. When the power-up interval has been completed, this logical output 20 will be asserted. At this point, because multiplexer 95 is being controlled to select for this output, the LOAD signal will be asserted such that the address 75 from program counter 70 will correspond to the jump destination from the executed microinstruction for state SN. Sequence memory will now retrieve the appropriate microinstruction which may arbitrarily be denoted to correspond to a state SQ. Microsequencer 40 may then sequence or jump through any number of states. These states may be arbitrarily denoted as states SQ through SZ. For these states, however, the executed microinstructions from microsequencer 40 would all have this "power bad suppressor" input within field 320 set to true, thereby permitting normal operation of the power bad flag.

As described above, macrocells 30 may be configured to operate either sequentially or combinatorially. Should macrocells 30 be configured for combinatorial operation, they provide no memory functionality. Thus, in such combinatorial operation, microsequencer 40 provides the sole means for storing the current state of the desired finite state machine. Should macrocells 30 be configured for sequential operation, they may be used to store secondary state information as desired by a user.

Consider the advantages of the microsequencer architecture disclosed herein. The sequential actions for the desired finite state machine may be controlled by the sequential bit patterns output through the microsequencer's auxiliary command 45. By processing auxiliary command 45 in conjunction with inputs 15, logic block 10 allows single-cycle conditional branches to be made on complex Boolean conditions (e.g. X AND (Y OR NOT Z), where X,Y, and Z are included within inputs 15. This results in a language with the following statements:

OUTPUT VARIABLE1=TRUE|FALSE,
VARIABLE2=TRUE|FALSE, . . .
IF<boolean_expression>GOTO STEP XXX The ability to branch on the outcome of a complex and arbitrary boolean expression is a capability provided by the microsequencer architecture disclosed herein. Such a capability is not normally provided by a traditional microsequencer, where branching decisions are based on the status of one or more bits, and complex boolean conditions must be evaluated in multiple cycles. Rather than use multiple cycles, the complex expressions are evaluated in one clock cycle by logic block 10, and the resulting single boolean result is used to control the microsequencer's decision to jump or not to jump.

The above-described embodiments of the present invention are merely meant to be illustrative and not limiting. Various changes and modifications may be made to the embodiment without departing from the principles of this invention. For example, although microsequencer 40 has been described as performing the sequencing for a programmable-AND-array-based logic block, it will be appreciated that microsequencer 40 may receive its input conditions from other types of logic blocks such as lookup-table-based logic blocks. Accordingly, the appended claims encompass all such changes and modifications as fall within the true spirit and scope of this invention.

What is claimed is:

1. A programmable logic device comprising;
   a programmable logic block including a plurality of macrocells, the macrocells operable to provide logical outputs at the block's output terminals from logical inputs received at the block's input terminals; and
   a hardwired microsequencer coupled to the input and output terminals of the programmable logic block, the microsequencer operable to provide a sequence of logical inputs to the programmable logic block, at least part of the sequence determined by logical outputs provided by the macrocells of the programmable logic block.

2. The programmable logic device of claim 1, wherein the programmable logic block comprises a programmable AND array configured to provide a plurality of product terms based upon a set of logical inputs, and wherein the plurality of macrocells are operable to generate the logical outputs from the product terms.

3. The programmable logic device of claim 1, wherein the part of the set of logical inputs provided to the programmable logic block by the microsequencer are derived from microinstructions executed by the microsequencer.

4. The programmable logic device of claim 2, wherein the microinstructions include an input, a jump destination, and a select command.

5. The programmable logic device of claim 1, wherein the microsequencer includes:
   a memory configured to store a set of microinstructions that include at least some of the logical inputs provided to the programmable logic block; and
   a program counter coupled to the memory and configured to provide addresses to the memory to select the microinstructions for execution, the program counter responsive to logical outputs received from the macrocells.

6. The programmable logic device of claim 5, wherein the program counter is responsive to a jump destination derived from a previously executed microinstruction.

7. The programmable logic device of claim 5, wherein the memory is non-volatile.

8. The programmable logic device of claim 5, wherein the microsequencer includes: a multiplexer having input terminals for receiving the logical outputs from the macrocells; an output terminal coupled to the program counter; and a select terminal coupled to an output terminal of the memory, the multiplexer responsive to a select command derived from a previously executed microinstruction.

9. A method of sequencing a finite state machine, comprising:
   generating input conditions for a finite state machine in a programmable logic block based upon a set of inputs;
   selecting an input condition from the generated input conditions based upon a previously-executed microinstruction selected from a hardwired read-only memory;
   selecting a microinstruction from a set of stored microinstructions in the read-only memory based upon the selected input condition and the previously-executed microinstruction; and
   executing the selected microinstruction to provide inputs for the set of inputs.

10. The method of claim 9, wherein the selecting a microinstruction act comprises:
    if the selected input condition is in a first binary state, selecting the microinstruction at a jump destination derived from the previously-executed microinstruction; and
    if the selected input condition is complementary to the first binary state, selecting the microinstruction according to a predetermined microinstruction sequence.

11. The method of claim 10, wherein the executing co the microinstruction act includes determining the first binary state.

12. The method of claim 9, wherein the programmable logic block comprise a programmable AND array, and the generating input conditions act comprises processing product terms through the programmable AND array.

13. A programmable logic device, comprising;
  a logic block including a plurality of macrocells, the macrocells operable to provide input conditions for a finite state machine based upon a set of inputs; and
  a hardwired microsequencer configured to determine a next state of the finite state machine by cyclically executing a microinstruction selected from a set of microinstructions responsive to cycles of a system clock, wherein at a given cycle of the system clock, the executed microinstruction depends upon the previously-executed microinstruction and an input condition selected from the input conditions provided by the macrocells of the logic block, and wherein the set of inputs for the logic block includes inputs derived from the executed microinstruction.

14. The programmable logic device of claim 13, wherein the hardwired microsequencer includes:
  a sequence memory configured to store the set of microinstructions; and
  a program counter configured to determine the microinstruction to be executed at each internal clock cycle, wherein depending upon the selected input condition, the program counter determines the microinstruction either according to a predetermined sequence of the microinstructions or to a jump destination derived from the previously-executed microinstruction.

15. The programmable logic device of claim 14, wherein the sequence memory is a read-only memory.

16. The programmable logic device of claim 14, wherein the sequence memory is a non-volatile electrically-alterable read-only memory.

17. The programmable logic device of claim 14, wherein the hardwired microsequencer further includes a multiplexer configured to select from the input conditions provided by the logic block and determine the selected input signal according to a condition selection command derived from the previously-executed microinstruction.

18. The programmable logic device of claim 14, wherein the program counter is configured to determine the microinstruction according to the jump destination if the selected input condition is in a first binary state and wherein the program counter is configured to determine the microinstruction according to the predetermined sequence if the selected input condition is in the complementary binary state to the first binary state.

19. The programmable logic device of claim 18, wherein the first binary state is determined by the previously-executed microinstruction.

20. The programmable logic device of claim 18, wherein the hardwired microsequencer further includes;
  a multiplexer configured to select from the input conditions provided by the logic block and determine the selected input signal according to a condition selection command derived from the previously-executed microinstruction; and
  an exclusive OR gate configured to receive the selected input signal from the multiplexer and a binary state selection command derived from the previously-executed microinstruction to determine the first binary state.

* * * * *

UNITED STATES PATENT AND TRADEMARK OFFICE
CERTIFICATE OF CORRECTION

PATENT NO.      : 6,958,625 B1
DATED           : October 25, 2005
INVENTOR(S)     : Edward A. Ramsden It is certified that error appears in the above-identified patent and that said Letters Patent is hereby corrected as shown below:

Column 6,
Line 61, "executing co the" should read -- executing the --.

Signed and Sealed this

Twenty-seventh Day of December, 2005

JON W. DUDAS
*Director of the United States Patent and Trademark Office*